United States Patent
Langlais

(10) Patent No.: US 6,974,544 B1
(45) Date of Patent: Dec. 13, 2005

(54) MEMBRANE FILTRATION

(75) Inventor: Chrystelle Langlais, Le Pecq (FR)

(73) Assignee: Ondeo Degremont, Rueil-Malmaison (FR)

( * ) Notice: Subject to any disclaimer, the term of this patent is extended or adjusted under 35 U.S.C. 154(b) by 0 days.

(21) Appl. No.: 10/148,070

(22) PCT Filed: Oct. 26, 2000

(86) PCT No.: PCT/FR00/02991

§ 371 (c)(1),
(2), (4) Date: May 28, 2002

(87) PCT Pub. No.: WO01/41906

PCT Pub. Date: Jun. 14, 2001

(30) Foreign Application Priority Data

Dec. 9, 1999 (FR) .................................. 99 15551

(51) Int. Cl.⁷ .......................... B01D 61/00; B01D 21/00
(52) U.S. Cl. ....................... 210/650; 210/651; 210/652; 210/653; 210/654; 210/777; 210/702; 210/723; 210/696
(58) Field of Search ................ 210/650–654, 210/777, 702, 723, 696

(56) References Cited

U.S. PATENT DOCUMENTS 5,871,648 A * 2/1999 Allen et al. ................. 210/638
6,416,668 B1 * 7/2002 Al-Samadi ................. 210/636

OTHER PUBLICATIONS

J. Allam et al., 2003, Ultrafiltration pre-treatment to RO: Trials at Kindasa water services, Jeddah, Saudi Arabia, IDA Conference in Bahamas.
V. Lahoussine-Turcaud et al., 1990, Coagulation Pretreatment for Ultrafiltration of a surface water, *J. Am. Water. Work. Assoc.*, 81, pp 76-81.

* cited by examiner

*Primary Examiner*—W. L. Walker
*Assistant Examiner*—K S Menon
(74) *Attorney, Agent, or Firm*—Connolly Bove Lodge & Hutz LLP

(57) ABSTRACT

A method for membrane filtration of effluent water containing suspended matter reduces membrane clogging and improves filtration capacity of the membrane. The method includes adding a dose of a preselected coagulation reactant to the effluent before the effluent passes over the membrane. The added dose is a fraction of the coagulating reactant dose (X) that would render the zeta potential of the effluent equal to zero. The range of the added dose is X/30-X/80. The suspended matter in the effluent is subjected to the added dose of coagulation reactant for destabilizing the suspended matter.

2 Claims, 1 Drawing Sheet

MEMBRANE FILTRATION

FIELD OF THE INVENTION

The present invention relates to improvements to membrane filtration of effluents, especially water, containing suspended matter for the purpose of reducing or preventing the membranes from clogging and of improving the filtration capacity of the latter.

BACKGROUND OF THE INVENTION

It is known that filtration (micro-, ultra-, nano- or hyperfiltration) membranes are sensitive to clogging by various types of substances: dissolved substances, such as organic materials, substances in the colloidal state, such as metal hydroxides, or, in general, substances in suspension (suspended matter or SM). Clogging results in a very substantial reduction in the filtration capacity of the membrane, the reduction in capacity not always being reversible, the effectiveness of membrane cleaning depending considerably on various factors, such as the effective residence time of the fouling product on the membrane, its relative solubility in the cleaning products and the chemical or physico-chemical interactions between the said fouling product and the surface of the membrane, the latter factor being eminently variable according to the chemical composition of the polymer constituting the membrane.

It is also known (see especially "Mémento Technique de l'Eau [*Water Technical Memorandum*]", Volume 1, Chapter 3.1 and Chapter 4.1, published by DEGREMONT, 1989) that coagulation makes it easier to remove the suspended and colloidal matter. In particular, a person skilled in the art knows that coagulation by metal salts makes it possible to destabilize the colloids and to precipitate certain organic materials after adsorption, for example on metal hydroxides. There are several approaches for characterizing this phenomenon:

- by a coagulation-flocculation test in a laboratory beaker with various doses of metal salt and estimation, for example, of the settling rates;
- by measuring the zeta potential (ZP) and especially the variation in the said ZP as a function of the doses of metal salt added, until that dose which makes the ZP zero, and which therefore corresponds to the required level of treatment for obtaining optimum coagulation, is determined.

These two approaches lead to a definition of a coagulant dose called the "optimum coagulation dose" which, from the experience gained by those skilled in the art, is the dose which allows the best clarification treatment of the water being treated and which, consequently, will ensure the optimum working conditions of the membrane (that is to say the least fouling conditions).

The drawback of such a treatment involving this optimum coagulation dose is that this dose is relatively high and has repercussions on the operating cost of the clarification treatment and also on the cost of investing the corresponding equipment.

Moreover, it should be noted that most membrane suppliers and suppliers of nanofiltration and reverse osmosis equipment insist, for fear of loss of the guarantees associated with the membranes, on feeding them only with water having a zero, or at the very least a very low, content of heavy metals such as divalent or trivalent ions, in particular such as ferric ions.

Thus, in the literature there are many publications mentioning the use or the injection of one or more metal salts upstream of the membrane treatments. It should be emphasized that these publications mentioned doses close to that making the ZP zero or, at the very least, high doses, close to 30% and more of the said optimum dose for making the said ZP zero.

BRIEF DESCRIPTION OF THE INVENTION

The present invention has the objective of providing a process making it possible to minimize, or at the very least reduce, the clogging of membranes and to improve their filtration capacity, while making the process more economic. To achieve this result, the technical problems to be solved are the following:

- how to substantially increase the specific production flux ($l.h^1.m^{-2}$ of membrane);
- how to produce the least sludge (of hydroxides for example) resulting from the clarification treatment and, above all:
- how to reduce the area of the membranes to be fitted, in order to treat the same volume of water.

The Proprietor has observed, in a really surprising manner for one skilled in the art, that a dose of coagulation reactant very much less than the dose which makes the zeta potential of the water to be treated zero allows the filtration capacity of the membrane to be considerably improved.

The subject of this invention is therefore improvements to the membrane filtration, especially micro-, ultra-, nano or hyperfiltration, of effluents, especially water, which contains suspended matter, so as to reduce clogging of the membranes and improve the filtration capacity thereof, characterized in that they consist in adding to the effluent to be filtered, coagulation reactant which destabilizes the colloidal matter in suspension. The added dose is a fraction of the dose (X) making the zeta potential zero. The fraction of the added dose is in the range $X/30$–$X/80$.

According to an advantageous method of implementing the process according to the invention, the dose of coagulation reactant is around $X/40$–$X/60$.

The field of application of the invention is particularly wide. This is because it can be used especially for the membrane treatment of water coming from various sources, such as for example:

- municipal waste water, after a biological treatment and a separation allowing less than 20 mg/l of SM to be obtained;
- water not requiring the prior removal of organic matter and having a total organic carbon (TOC) content of less than 2 ml/g; and
- raw surface water, having a low TOC, a high colloidal concentration and containing less than 200 mg/l of SM.

The process according to the invention gives excellent results when it is applied to membranes of different shapes (capillary, tubular, planar and spiralled membranes) with an internal or external skin, having various configurations (in a casing, without a casing and immersed in a basin). The invention is also suitable for applications involving the spraying of recreational areas, the reutilization of waste water in factories and, more generally, the upstream pretreatment of reverse-osmosis desalination plants.

Further features and advantages of the present invention will become apparent from the description given below with reference to the appended drawing and to the illustrative examples given below. In the drawing:

DETAILED DESCRIPTION OF THE INVENTION

In both figures, identical or similar elements are denoted by the same reference numbers.

Figure 1:
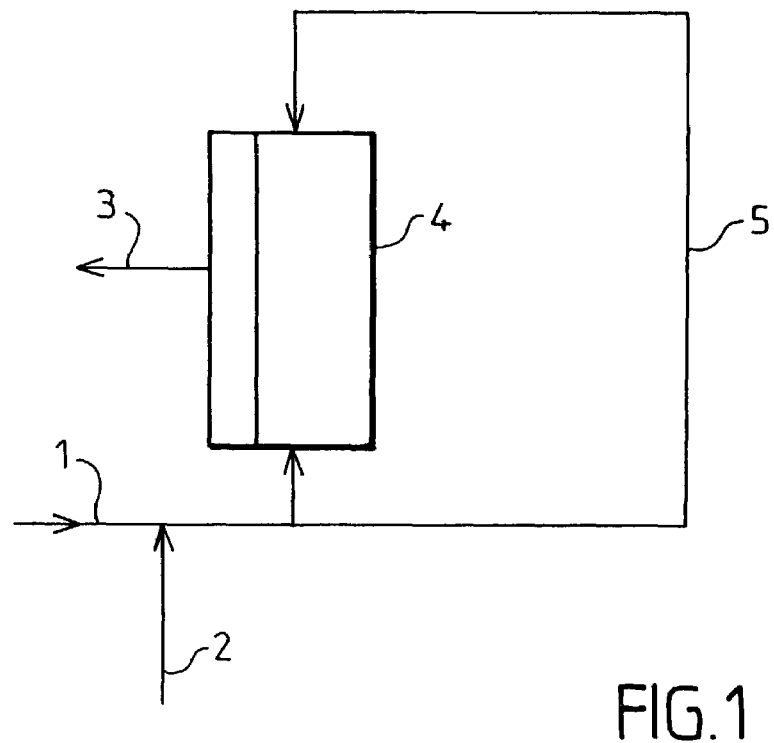
FIG. 1 is a schematic view illustrating the injection of coagulating reactant, for example a metal salt, especially an iron salt, upstream of a membrane in a casing into the flow.

In the method of implementation shown in FIG. 1, the coagulating reactant is injected at 2 into the water 1 to be treated and the water to be treated/coagulating reactant mixture is filtered over the membrane in the casing 4. The system includes a recirculation loop 5. The reference number 3 denotes the outflow of the treated water.

Figure 2:
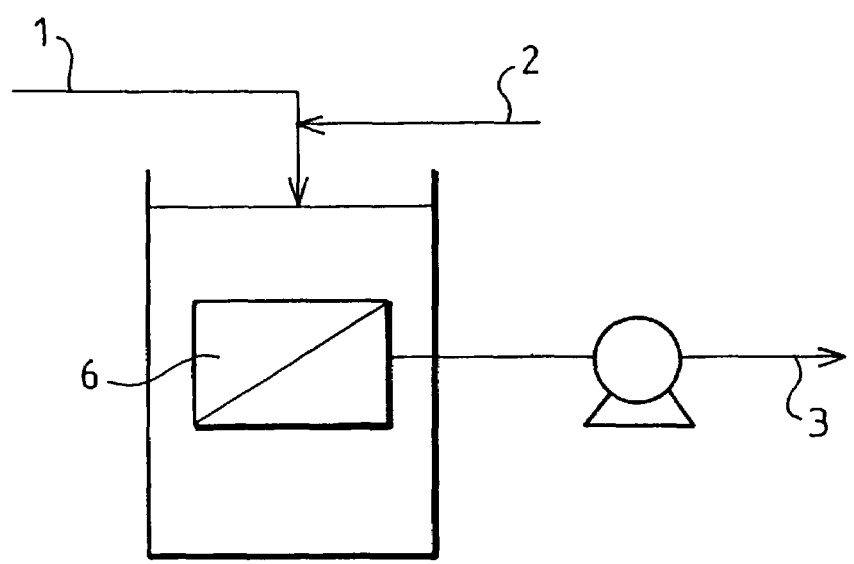
FIG. 2 is also a schematic view illustrating the injection of the coagulating reactant upstream of an immersed membrane without a casing.

In the example of implementation illustrated in FIG. 2, the coagulating reactant 2 is injected into the water 1 to be treated, the mixture then being filtered over the membrane 6, without a casing, immersed in a basin containing the water to be treated. The treated water 3 is discharged by means of a pump.

Given below are two numerical examples of implementation so as to make the technical aspects and advantages afforded by the present invention clearly apparent.

Example 1: Treatment of Municipal Waste Water

A biological treatment test was carried out on municipal waste water coming from a fabric-membrane bioreactor, such as the one described in FR-A-2 775 911.

The quality of the water output by the reactor was the following:

| | |
|---|---|
| Total COD: | 40 mg/l |
| Total $BOD_5$: | <10 mg/l |
| SM: | 5 mg/l |
| TOC: | 6 mg/l. |

The dose which makes the zeta potential (ZP) zero was found by laboratory trial to be 140 mg/l of $FeCl_3$ (expressed as pure $FeCl_3$). The optimum dose of coagulating reactant, determined by in-beaker flocculation, to reduce the organic matter (measured by UV absorption at 254 nm) was 110 mg/l.

The output of treated water from the fabric-membrane reactor was 1 $m^3$/h. The steady flux through the capillary ultrafiltration membrane was 32 $l.h^{-1}.m^{-2}$. When a small amount of coagulating reactant was used, by injecting into the line 3 mg/l of $FeCl_3$ (expressed as pure $FeCl_3$), the steady flux was 100 $l.h^1.m^{-2}$.

The backwashing was carried out with 5 mg/l of chlorine for 30 seconds every 30 minutes and, from time to time, for example once a month, with ammoniacal citric acid. The backwashing water was returned to the top of the fabric-membrane bioreactor.

In this example, to treat 1 $m^3$/h without a coagulating reactant, 35 $l.h^{-1}.m^{-2}$ was obtained and a membrane area of 28.5 $m^2$ was therefore required. In contrast, by injecting 3 mg/l of $FeCl_3$, 100 $l.h^{-1}.m^{-2}$ was obtained and the membrane area required was then 10 $m^2$. This represents an improvement in flux of 285% and a saving of 18.5 $m^2$, i.e. 65%, of membrane at least.

Sludge production was measured to be about 8 mg/l with 3 mg/l of $FeCl_3$ instead of 5 mg/l without the addition of a coagulating reactant; however, this remained very much less than the amount which would be produced with 125 mg/l of $FeCl_3$, i.e. more than 90 mg/l of sludge formed.

It is clear that the experiment reported above and the results that it provides go counter to the experience of a person skilled in the art and the teaching that he can extract from the prior art. This is because:

- the increase in flux through a membrane, by incomplete clarification (with a coagulant dose markedly less than the optimum clarification dose), and
- the use of coagulating agents (especially ferric salt) in small amounts, but nevertheless very much greater than the contents normally prohibited by most membrane manufacturers and suppliers, are completely contradictory to the commonly accepted routine use of membranes.

Example 2: Treatment of Surface Raw Water

The trial was carried out on raw water from the Seine, the characteristics of which were the following:

| | |
|---|---|
| Turbidity | 15 NTU |
| Organic matter | 5 mg/l $O_2$ ($KMnO_4$ oxidizability) |
| TOC | 3 mg/l |
| UV | 8 mg/l. |

In laboratory testing, the dose which made the ZP equal to zero was 55 mg/l of $FeCl_3$.

The output of treated water was 150 l/h. The steady flux through the capillary ultrafiltration membrane was 80 $l.h^{-1}.m^{-2}$. When a small quantity of coagulating reactant was used, by in-line injection of 2 mg/l of $FeCl_3$ (expressed as pure $FeCl_3$), the maximum steady flux improved by 30%.

The backwashing was carried out with 5 mg/l of chlorine for 30 seconds every 30 minutes.

In this example, in which a surface raw water was pretreated with the objective of treating it downstream by reverse osmosis, a major saving in membrane area was also found. All the TOC was not eliminated, but the flux was improved.

It follows from reading the description given above that the invention does actually limit clogging of the membranes, by considerably improving the filtration capacity of the latter. This results in very substantial economic advantages, especially a reduction in the area of membrane to be installed in order to treat the same volume of water.

Of course, it goes without saying that this invention is not limited to the examples of implementation and/or application mentioned and/or described here, rather it encompasses all variants thereof.

What is claimed is:

1. A method for maintaining the hydraulic performance of a micro or ultra filtration membrane during filtration of effluent water containing suspended matter by reducing membrane clogging and improving filtration capacity of the membrane, the method comprising the steps:

providing an effluent having as a principal pollutant colloidal organic suspended matters such effluent selectively being, municipal waste water, after a biological treatment and a separation allowing less than 20 mg/l of suspended matter (SM) to be obtained, water not requiring the prior removal of organic matter and having a total organic carbon (TOC) content of less than 2 mg/L, or raw surface water, having a low TOC, a high colloidal concentration and containing less than 200 mg/l of SM;

determining the dose (X) of a preselected coagulation reactant that would render the Zeta Potential of the effluent equal to 0;

adding a dose of a preselected coagulation reactant to the effluent directly before the effluent passes over the membrane, the added dose being X/30–X/80 and by far insufficient to neither cause complete clarification nor neutralization of Zeta Potential; and directly passing the effluent over the membrane after the dose has been added.

2. A method for maintaining the hydraulic performance of a micro or ultra filtration membrane during filtration of effluent water containing suspended matter by reducing membrane clogging and improving filtration capacity of the membrane, the method comprising the steps:

providing an effluent having as a principal pollutant colloidal organic suspended matter, such effluent selectively being, municipal waste water, after a biological treatment and a separation allowing less than 20 mg/l of SM to be obtained, water not requiring the prior removal of organic matter and having a total organic carbon (TOC) content of less than 2 mq/L, or raw surface water, having a low TOC, a high colloidal concentration and containing less than 200 mg/l of SM;

determining the dose (X) of a preselected coagulation reactant that would render the Zeta Potential of the effluent equal to zero;

adding a dose of the preselected coagulation reactant to the effluent directly before the effluent passes over the membrane, the added dose being X/40–X/60 and by far insufficient to neither cause complete clarification nor neutralization of Zeta Potential; and directly passing the effluent over the membrane after the dose has been added.

* * * * *